(12) United States Patent
Gray

(10) Patent No.: US 9,911,237 B1
(45) Date of Patent: Mar. 6, 2018

(54) IMAGE PROCESSING TECHNIQUES FOR SELF-CAPTURED IMAGES

(71) Applicant: A9.com, Inc., Palo Alto, CA (US)

(72) Inventor: Douglas Ryan Gray, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 17 days.

(21) Appl. No.: 15/072,910

(22) Filed: Mar. 17, 2016

(51) Int. Cl.
| G06T 19/00 | (2011.01) |
| G06T 7/00 | (2017.01) |
| G06T 7/20 | (2017.01) |
| H04N 7/18 | (2006.01) |
| G06T 3/40 | (2006.01) |
| G06F 17/30 | (2006.01) |
| G06T 7/13 | (2017.01) |
| G06T 7/246 | (2017.01) |
| G01S 19/42 | (2010.01) |

(52) U.S. Cl.
CPC ...... *G06T 19/006* (2013.01); *G06F 17/30256* (2013.01); *G06T 3/40* (2013.01); *G06T 7/0085* (2013.01); *G06T 7/13* (2017.01); *G06T 7/2033* (2013.01); *G06T 7/246* (2017.01); *H04N 7/185* (2013.01); *G01S 19/42* (2013.01)

(58) Field of Classification Search
CPC .. G06T 3/40; G06T 7/13; G06T 7/246; G06T 19/006; G06F 17/30256; G01S 19/42; H04N 7/185
See application file for complete search history.

(56) References Cited

U.S. PATENT DOCUMENTS

| 2004/0174434 A1* | 9/2004 | Walker | G06F 17/30265 348/211.3 |
| 2009/0245775 A1* | 10/2009 | Osawa | G03B 15/02 396/61 |
| 2012/0002081 A1* | 1/2012 | Chou | H04N 5/23219 348/234 |
| 2015/0106236 A1* | 4/2015 | Morris | G06Q 50/01 705/26.64 |
| 2015/0350511 A1* | 12/2015 | Kaikumaa | G03B 13/36 348/363 |

* cited by examiner

*Primary Examiner* — Katrina Fujita
(74) *Attorney, Agent, or Firm* — Hogan Lovells US LLP

(57) ABSTRACT

Image processing techniques for self-captured images are disclosed. An image can be captured during activation of an illumination element of a mobile device. Presence of a representation of the mobile device can be determined in the captured image based at least in part upon locating a reflection of an illumination produced by the illumination element. Dimensions of the representation of the mobile device can be determined and compared to actual dimensions of the mobile device to provide a scaling factor. The scaling factor can be used to determine the size of various objects, including articles of clothing, in the image.

18 Claims, 8 Drawing Sheets

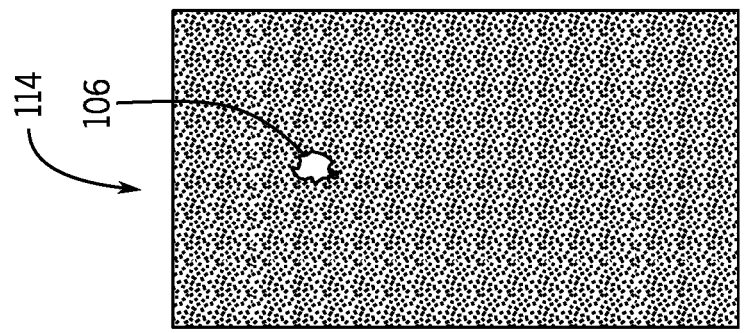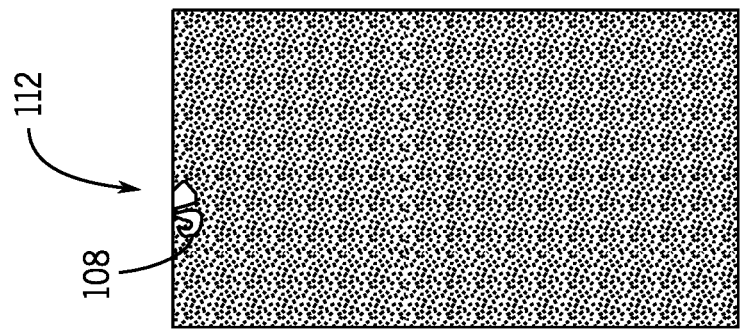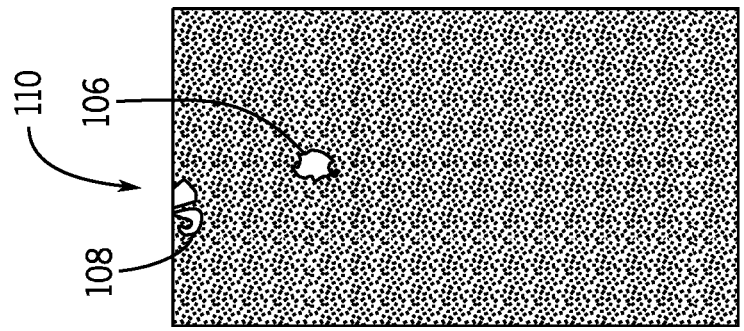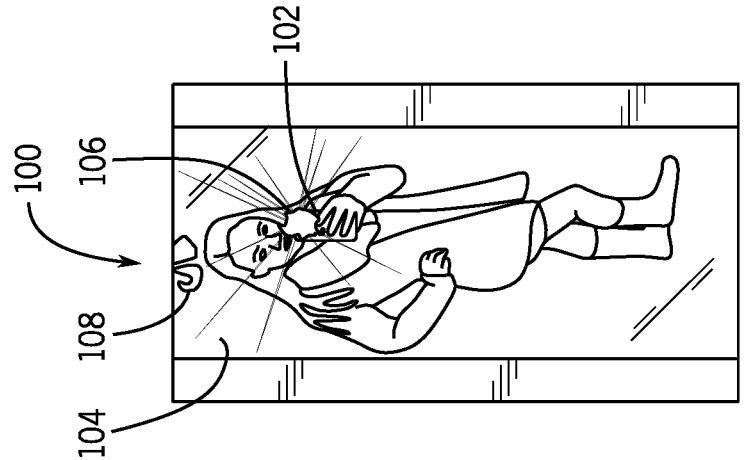

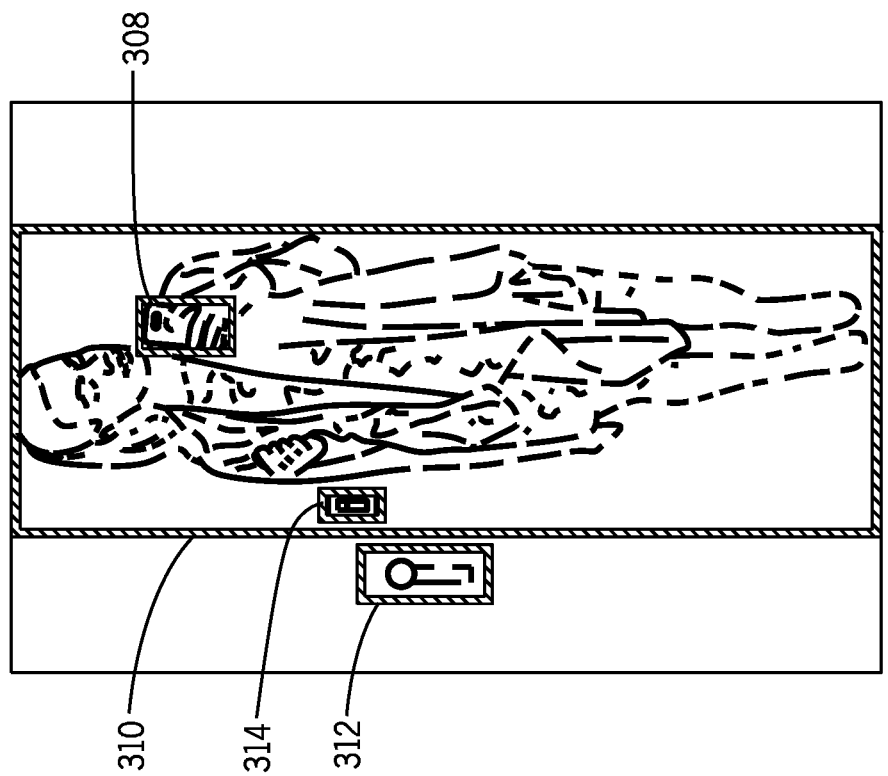
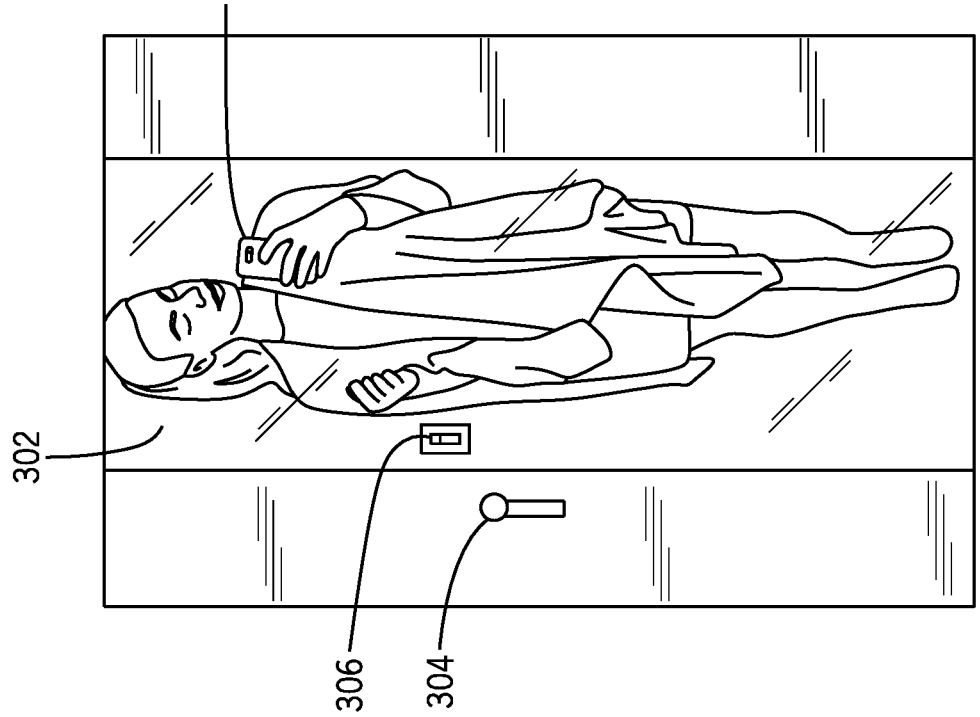

IMAGE PROCESSING TECHNIQUES FOR SELF-CAPTURED IMAGES

BACKGROUND

Recent years have seen the widespread adoption of smartphones and other mobile devices with image capture capabilities. As a result, users of these mobile devices are taking more photographs and videos than ever before. In many cases, the user wishes to capture an image of himself or herself. The act of taking a "selfie" often involves capturing an image of the user's reflection in a mirror or other reflective surface.

Self-captured images can be taken in scenarios that do not arise for the capture of other images. For example, a subject may want to see how he or she looks in an article of clothing, or the subject may want to find similar clothing in the same size. Sizing issues, in particular, present guesswork for a subject, especially if the user has to guess his or her size for a different brand or manufacturer. The subject may not know if she guessed correctly until she orders and receives an article of clothing.

BRIEF DESCRIPTION OF THE DRAWINGS

Various embodiments in accordance with the present disclosure will be described with reference to the drawings, in which:

FIGS. 1A-1D illustrate an example approach that can be utilized in accordance with various embodiments;

FIGS. 3A-3B illustrate an example approach that can be utilized in accordance with various embodiments;

DETAILED DESCRIPTION

Figure 2:
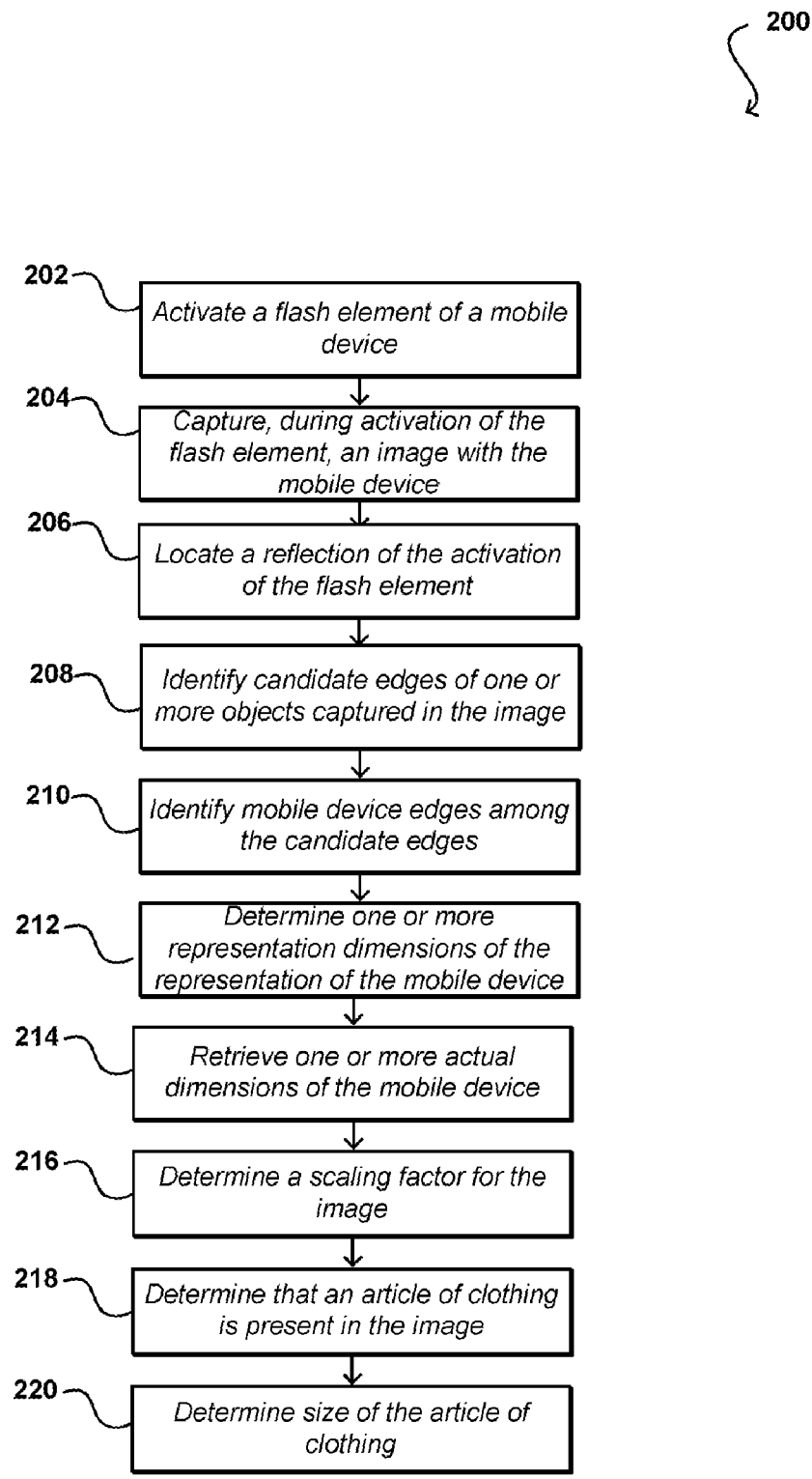
FIG. 2 illustrates an example process that can be utilized in accordance with various embodiments.

Systems and methods in accordance with various embodiments of the present disclosure overcome one or more of the aforementioned and other deficiencies experienced in conventional approaches. In particular, various embodiments enable approaches to processing self-captured images. For example, embodiments enable technical image categorization and scaling techniques.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

According to various embodiments, a mobile device is located in an image. In embodiments, a mobile device is used to capture an image. During capture of the image, a flash element on the mobile device is activated. In embodiments, the captured image includes a reflective image, such that a flash produced by the flash element of the mobile device is visible in the captured image. Various techniques can be used to locate a reflection of the flash in a captured image. The location of the reflection of the flash can be used to locate the representation of the mobile device. For example, the location of the reflection flash can be located by isolating regions of the image having high luminous intensity. An edge detection algorithm can be performed to identify a number of edges in the image, with the understanding that some of these images may correspond to edges of the representation of the mobile device. In embodiments, an edge map can be generated from a captured image. An edge map can assign to each pixel in an image a likelihood that the pixel forms part of an edge.

Various techniques can be used to identify the mobile device edges from the edges of other candidate objects represented in the image. For example, the proximity of identified edges to the location of the reflection of the flash can indicate a likelihood that the identified edge corresponds to a mobile device edge. In embodiments, the size and configuration of identified edges can be used as indicators too. Once edges are identified as belonging to the representation of the mobile device, these edges can be measured within the image. That is, measurements can be taken, for example in pixels, of the size of each edge of the representation of the mobile device in the image to provide one or more representation dimensions of the mobile device.

According to various embodiments, the actual dimensions of the mobile device can be retrieved. For example, during capture of the image, description data can be generated. The description data can include information capable of identifying the mobile device. The description data can then be used to search a database of mobile device specification information to obtain the actual dimensions of the mobile device.

According to various embodiments, a scaling factor can be determined based on a proportionality between the representation dimensions of the mobile device and the actual dimensions of the mobile device. The scaling factor can be used to determine the size of various objects in the image, including articles of clothing in various embodiments. In embodiments, additional information on articles of clothing represented in the image or related articles of clothing corresponding in size to articles of clothing represented in the image can be presented at an interface of the mobile device.

According to various embodiments, locating the mobile device in an image can trigger categorization of the image as self-captured. Based on this categorization, the image can, for example, be automatically transferred to predefined contacts, published to a particular network, or stored in a specified manner, format, or location.

In various embodiments, image processing techniques are applied to existing images, as opposed to processing images at the time of capture. For example, the image can be one of a number of images stored in a database. The database can be crawled for indications of a reflection of a flash or a representation of a mobile device using various techniques discussed below. If a representation of a mobile device is located in an image in the database, image processing techniques can be applied to the image according to various embodiments.

FIG. 1A illustrates an example approach in accordance with various embodiments. A mobile device 102 can be used to capture an image 100. The image 100 can include a reflective surface, such as a mirror 104. Other reflective surfaces, however, can be used in various embodiments. For convenience, the image 100 of FIG. 1A depicts a mirror 104 as the reflective surface. As discussed in more detail below, a reflection of a flash 106 can be located in the image 100.

Various techniques can be used to locate the flash 106 in the image 100. For example, it may be the case that the captured image 100 includes other light sources 108. These light sources may be artificial light sources or natural light sources. In an embodiment, to locate the mobile device 102 in the image 100, it may be desirable to differentiate between the flash 106 and other light sources 108.

One technique to do this is to capture multiple images, including at least one image captured with a flash and at least one image captured without a flash, and to perform image subtraction on binary mask versions of these images to isolate a flash. A grayscale image can convey spatially varying intensity information in an image, and a binary mask can convey spatially varying binary signals. For example, a pixel determined to be below some threshold intensity can appear as black. A pixel determined to be at or above the threshold intensity can appear as white. Thus, a binary mask can be used to produce a black and white image based on the luminous intensity at various regions in the image. Binary masks can be calibrated to show only very high intensity values. For instance, in embodiments, a binary mask image can be set to show sections having a threshold intensity value in the 95th percentile in the image. Other threshold intensity values can be set as well, depending on a number of factors, such as the brightness of the flash and the number and intensity of other light sources. A grayscale image can be used in embodiments as well. In a grayscale image, a spectrum, rather than a binary choice, can reflect luminous intensity at different regions. The higher the luminous intensity in the image, the lighter a segment of a grayscale image will appear. Conversely, the lower the luminous intensity, the darker a segment of a grayscale image will appear.

FIGS. 1A-D illustrate an example use of binary masks. For example, a first image 100 can be captured during activation of a flash element. In embodiments, the flash element is affixed to the mobile device used to capture the image. For example, the flash element can be placed above the lens of a rear camera on a mobile device. A first binary mask 110, as depicted in FIG. 1B, can be generated based on the first image 100. The first binary mask 110 can be generated, for example, by the capturing device or it can be generated in concert with/by another device or system, such as a computer or server-based system. Because binary masks portray regions in the image based on the regions' luminous intensity, the first binary mask 110 can be used to locate only those regions of the first image 100 having a high luminous intensity when the flash element has been activated. Thus, in the example image 110 illustrated in FIG. 1B, the flash 106 and the light source 108 are visible. A second image can be captured much like the first image 100 but in the absence of a flash 106. A second binary mask 112, generated based on the second image, similarly depicts only areas of high luminous intensity as shown in FIG. 1C. Because the second binary mask 112 was generated from an image captured in the absence of a flash, however, only the non-flash light source 108 is visible in the image 112.

Thus, the above-described technique results in a first binary mask 110, which depicts all areas of high intensity in the image, and a second binary mask 112, which depicts all areas of high intensity in the image, except for the flash 106. Image subtraction techniques can be used to generate a difference image 114 as shown in FIG. 1D. The difference image 114 can be used to isolate the flash 106; for example, the flash 106 may in various approaches be the only high-intensity region that appears in the first binary mask 110 but is absent from the second binary mask 112.

According to various embodiments, image subtraction techniques can be used without the binary mask conversions discussed with regard to FIGS. 1A-D. For example, an image can be captured with a flash and an image can be captured without a flash. A difference image between the two images can be used to determine the location of the flash in embodiments. Generating a difference image between binary masks conversions allows for one technique to determine the location of the flash.

FIG. 2 describes an example process 200 that can be utilized in accordance with various embodiments. Embodiments include activating a flash element of a mobile device 202. During activation of the flash element, an image can be captured with the mobile device 204. Image, as used herein, can refer to one or more stills, video, or other visual information as described in more detail below. In addition, mobile device, as used herein, includes any computing device capable of image capture, as described in more detail below. In embodiments, the image includes a representation of the mobile device reflected in a mirror. A reflection can be observed in other reflective surfaces as well. For example, metallic surfaces can be used in appropriate circumstances. As another example, a window can be used as a reflective surface, particularly when the capture side of the window is illuminated by a constant light source, a flash, or other means and the non-capture side of the window is relatively dark.

Embodiments further include detecting, in the image, a reflection of the activation of flash element in the mirror or reflective surface 206. Various techniques to locate the flash produced by the activation of the flash element are discussed in this disclosure. For example, as discussed with respect to FIG. 1, image subtraction techniques can be used with binary masks to locate a flash or illumination. Various computer vision techniques can be used to locate the mobile device based on the location of the flash. For example, edge detection can be used to identify edges of a mobile device. It may be the case, however, that there are multiple objects with edges in the captured image. Thus, in embodiments, the edges of the representation of the mobile device can be distinguished from the edges of representations of other objects, thereby distinguishing the representation of the mobile device from the representations of other objects.

Using an edge detection algorithm, candidate edges of objects captured in the image can be identified 208. Candidate edges refers to all object edges that can be identified in the image because, at this stage of processing, all identified edges are candidates for mobile device edges. Among the candidate edges, mobile device edges can be identified 210. For example, object edges can be identified as edges of the representation of the mobile device based at least in part upon the location and arrangement of the object edges. For example, it may be determined that those object edges which are closest to the located reflection of the flash produced by the flash element correspond to the representation of the mobile device that captured the image.

The arrangement of the object edges can provide useful information as well. For example, if four object edges form a substantially rectangular shape and a located flash appears outside the bounds of the substantially rectangular shape, it can be determined that the detected rectangular shape does not correspond to the representation of the mobile device. On the other hand, if the detected flash corresponds to a location in the image that is interior to four object edges that form a substantially rectangular shape, it can be determined that the detected rectangular shape corresponds to the representation of the mobile device. Various other techniques, discussed below, can be used in addition to or in place of these techniques to identify mobile device edges, or a mobile device generally, in an image.

In embodiments, one or more representation dimensions of the mobile device can be determined 212. "Representation dimensions," as used herein, refers to the measurement of the representation of the mobile device in the image. For instance, the mobile device edges in the image can be measured in pixels. The representation dimensions of the mobile device can include any dimension that can be determined from the captured image. For example, the representation dimensions can include at least a mobile device representation length and a mobile device representation width. Other aspects of the representation of the mobile device can be measured as well. For example, in embodiments, measurements can be taken of a diagonal of the mobile device or a thickness.

Embodiments can further include retrieving one or more actual dimensions of the mobile device from a database that includes mobile device specification information 214. The mobile device specification information can include actual dimensions of the mobile device, such as the actual length of the mobile device and the actual width of the mobile device. In embodiments, description data can be generated during capture of the image. Thus, when the image is captured, the image can be "tagged" with this description data, which will then be transferred with the image or independently if desired. The description data can include the actual specification information of the mobile device. The description data can also include information capable of identifying the mobile device. In embodiments, the description data can be used to retrieve mobile device identification information from a database. For example, when an image is captured, data can be generated to indicate the model and production year of the mobile device. A search of a mobile device specification database can reveal the actual dimensions of the mobile device. In embodiments, the actual dimensions of the mobile device include a mobile device actual length and a mobile device actual width. As with the representation dimensions, however, any number of actual dimensions can be retrieved.

With one or more representation dimensions and one or more actual dimensions of the mobile device, a scaling factor for the image can be determined 216. In embodiments, the scaling factor corresponds to a proportionality between one or more representation dimensions of the mobile device and one or more actual dimensions of the mobile device. For example, it may be determined that the representation of the mobile device has a width of 40 pixels and the actual mobile device has a width of 10 cm. In that event, a scaling factor may be determined to the effect that a pixel in the representation of the mobile device amounts to 0.25 cm of the actual mobile device. If additional corresponding pairs of dimensions are determined, the scaling factor can be refined further.

In embodiments, it can be determined that an article of clothing is present in the image 218. The article of clothing can be an article worn by a subject who captures an image with a mobile device. For example, it can be determined that the subject is wearing a pair of jeans. As used herein, "article of clothing" refers to any wearable item. This includes not just clothes, but also watches, eyeglasses, and hats, to name a few examples. The a size of the article of clothing in the image can be determined 220 based at least in part upon the scaling factor determined for the image. Thus, in embodiments, a subject who captures a selfie can be provided with the size of the hat she is wearing or the size of her jeans.

In embodiments, computer vision techniques can be used to locate the mobile device. For example, various techniques include the use of edge detection algorithms, Hough transforms, and random sample consensus to determine the presence of a mobile device in an image. Various techniques will be discussed with reference to FIGS. 3A-B. FIG. 3A depicts an image captured by a mobile device 300. The image includes a mirror 302, though as noted previously, other reflective surfaces can be used as well. Various objects may appear in the image in addition to the mobile device 300. For example, a door latch 304 may appear adjacent the mirror 302. In addition, the mirror 302 may show the reflection of other miscellaneous objects, such as a light switch 306.

FIG. 3B illustrates an image processing step for the image of FIG. 3A in accordance with various embodiments. As noted, various techniques can be used, individually or in combination with one another, to determine the presence of the mobile device 300 in the image. For example, edge detection techniques can be used to determine object edges in the image. In embodiments, an edge map can be generated from a captured image. An edge map can assign to each pixel in an image a likelihood that the pixel forms part of an edge. The likelihood can be determined, for example, at least in part based upon similarities and differences between one or more pixels and one or more other pixels within some threshold distance. For example, it can be determined that a first group of pixels share a similar contrast, while an adjacent second group of pixels differ in contrast. In embodiments, it can be determined that an edge exists between the first group of pixels and the second group of pixels. It can also be determined, based on the similar contrast found in the first group of pixels, that no edges exist within the first group of pixels. In embodiments, other characteristics aside from the contrast can be used, individually or in combination, to generate an edge map.

In embodiments, a Hough transform can use an edge map as an input to provide a parametric representation of candidate edges in the image. For example, lines can be determined that correspond to edges. For instance, a grid can be superimposed on the image, and lines can be determined in slope-intercept form for a range of x-values that correspond to an identified edge.

In embodiments, substantially rectangular shapes (or other shapes) can be identified in the image. For example, FIG. 3B illustrates how objects can be "framed" according to various embodiments. A substantially rectangular shape is determined to exist around the mirror 310, door latch 312, light switch 314, and the mobile device 308. In embodiments, rectangle 308 can be identified as the rectangle of mobile device 300 based on the proximity of rectangle 308 to the detected location of a flash or illumination. In some embodiments, only rectangles within a threshold distance of the flash or illumination will be considered candidates for the mobile device 300. For instance, the rectangle corresponding to the door latch 312 may be considered too far away from the location of the flash to even qualify as a candidate for the mobile device 300. Likewise, rectangles may be eliminated if a dimension is below or above a set acceptable value (e.g., a threshold value). For example, the rectangle corresponding to the mirror 310 may have a length too large for it to be considered a candidate for mobile device 300.

In embodiments, the aspect ratio of substantially rectangular shapes identified in the image can be determined. As noted, this can include determining the aspect ratios for all substantially rectangular shapes or for some subset that remains after filtering. A random sample consensus (RANSAC) can be used to determine the correlation between one or more determined aspect ratios and one or more known aspect ratios. That is, a database including mobile device specification information can be used as part of various approaches to determine the aspect ratios of known mobile devices. RANSAC techniques can be used to determine whether the representation of the mobile device 300 is present in the image based at least in part upon the correlation between the determined aspect ratio and a known aspect ratio. For instance, it can be determined that rectangle 308 has a substantially similar aspect ratio to mobile device 300, which demonstrates that the image depicted in FIG. 3A includes mobile device 300. In embodiments, it can be taken into account whether mobile device 300 includes a case. The identification of a case or cover can be responsive to user input or computer vision techniques. The added dimensions of the case can then be considered when determining the expected aspect ratio of the mobile device 300.

Figure 4:
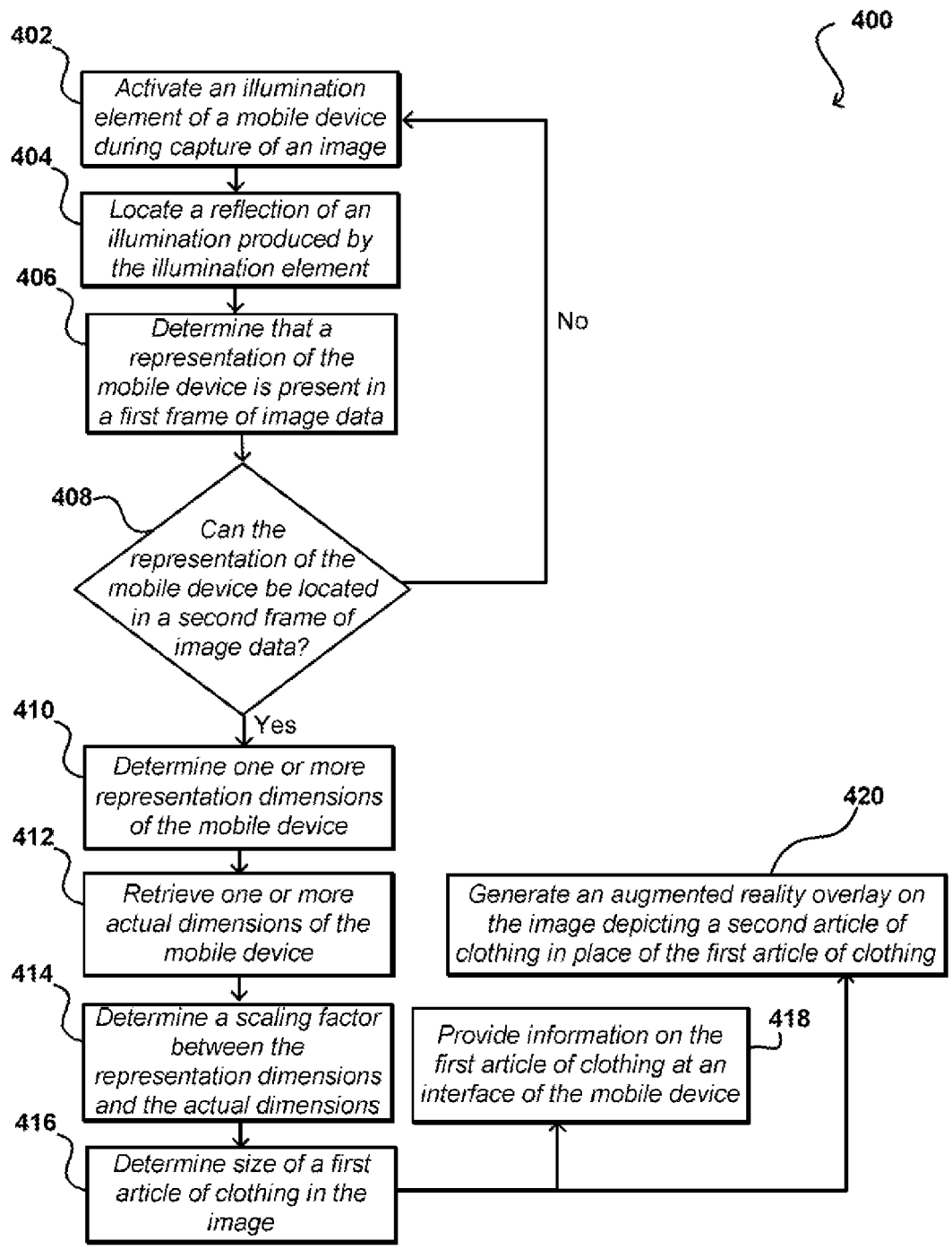
FIG. 4 illustrates an example process that can be utilized in accordance with various embodiments.

FIG. 4 illustrates an example approach in accordance with embodiments. Embodiments can include activating an illumination element of a mobile device during capture of an image 402. In embodiments, the illumination element can comprise a flash element as described above. Moreover, the illumination element can be activated a number of times, at various rates or durations in various embodiments, to produce a particular pattern. Thus, in embodiments, the flash pattern refers to a temporal pattern, or pattern in the timing of flashes. For example, it may be determined that certain environments are conducive than average to false positive detections of a flash or illumination. For example, a subject may attempt to self-capture an image while others in her vicinity are doing the same. Flashes from other cameras could incorrectly be attributed to the flash of the subject's mobile device. Thus, according to various embodiments, a particular flash pattern is located, rather than a single flash. The flash pattern can be provided in as a binary sequence, for example, or in any other format. For example, it can be determined that a particular flash pattern is unlikely to occur naturally, and that particular flash pattern can be located in the image according to various embodiments. In embodiments, a flash pattern refers to a spatial flash pattern, or a pattern in the spatial location of the flashes. For example, a mobile device may be equipped with a dual flash, or the mobile device may be configured to control a light source not on the mobile device but at a known spatial relationship relative to the mobile device. Producing a flash pattern can include activating multiple flashes in distinct locations such that a spatial pattern can be detected.

In embodiments, a flash pattern can comprise displaying or projecting a patterned image that can be detected in the captured image. For example, a mobile device can be equipped with a display on the same surface as the image capture element. For example, the primary display of a mobile device can be on the same surface as a front facing camera. In embodiments, a rear facing camera can be on the rear of the mobile device, and a secondary display can be placed on the rear of the device as well. In embodiments, the image capture element can capture an image that includes a display. The display can include, for example, a QR code, bar code, or another distinguishable pattern. In embodiments, a mobile device can be equipped with a projector, which can project a distinguishable pattern on a surface, even the user, captured in the image.

As noted, the illumination element can comprise a flash element. Any light signal, however, can be provided according to embodiments. For example, an infrared signal or laser signal can be used with the appropriate detection techniques. In addition, various forms of display technology can be used to produce an illumination. These include, for example, the displays described above, which can produce an illumination and produce a pattern that can be recognized in a captured image. Thus, activation of the illumination element does not necessarily require producing an illumination that is visible to the human eye. Regardless of the precise illumination element and/or approach used, a reflection of the illumination produced by the illumination element can be detected 404.

Using, for example, techniques described above, it can be determined whether a representation of the mobile device is present in the image. As noted above, the image can comprise a series of stills, a video, or other visual data. The image can be comprises of multiple frames of image data. In embodiments, the mobile device is tracked once its location is determined. That is, the location of the mobile device in a first frame of image data can be used to locate the mobile device in a second frame of image.

Thus, once the mobile device is identified, computer vision techniques can be used to follow the mobile device. In certain scenarios, the mobile device may be concealed entirely or otherwise not be visible after once being detected. For example, after the mobile device is located, a subject might cover the mobile device, except for the image capture element, with her hand, thus allowing an image to be captured, but obscuring the mobile device in the image. As another example, after the mobile device is located based on a flash location, the subject can move the mobile device from its original location, such that the location of the flash no longer provides a useful indicator of the location of the mobile device. As a further example, after the mobile device is located based on a flash location, a subject can move the mobile device entirely out of frame, but then angle the mobile device toward the subject's reflection. Thus, the mobile device can be capable of capturing an image of the subject's reflection, but the mobile device itself can be removed, at least temporarily, from a number of frames of image data. Therefore, according to various embodiments, it may be desirable to locate the mobile device for a second time.

Thus, in embodiments, it can be determined that a representation of the mobile device is present in a first frame of image data 406. It can then be determined whether the representation of the mobile device can be located in a second frame of image data 408. The second frame of image data does not necessarily directly follow the first frame of image data, as there may be intervening frames of image data between the first frame of image data and the second frame of image data. If it is determined that the representation of the mobile device cannot be located in a second frame of image data, then the illumination element can be activated again during capture of an image 402. For instance, the representation of the mobile device can be present at a first location in a first frame of image data, but the representation of the mobile device can be absent from the first location in a second frame of image data. In response to making a determination that in the second frame of image data that the representation of the mobile device cannot be located at the first location, the illumination element can be caused to activate again 402. Likewise, the reflection of the illumination can be detected 404, and presence of the mobile device can be determined. Thus, it may be determined in a third frame of image data that the representation of the mobile device is present at a second location in the image. This technique can be iterated as needed. For example, if a self-captured image involves a lot of motion, the mobile device may be lost and found more than once.

As described above, one or more representation dimensions of the mobile device can be determined 410, and one or more actual dimensions of the mobile device can be retrieved 412. A scaling factor between the one or more representation dimensions and one or more actual dimensions can be determined 414. The scaling factor can be used to determine the size of a first article of clothing in the image. For example, the first article of clothing can be clothing worn by the subject who captures the image with the mobile device. The first article of clothing can also be present in the background, for instance.

In embodiments, information on the first article of clothing can be provided at an interface of the mobile device 418. Also, once the first article of clothing is sized, a second article of clothing can be determined to have a corresponding size. Thus, an augmented reality overlay can be generated on the image depicting the second article of clothing in place of the first article of clothing 420. These features will be discussed in more detail in reference to FIG. 6.

Figure 5:
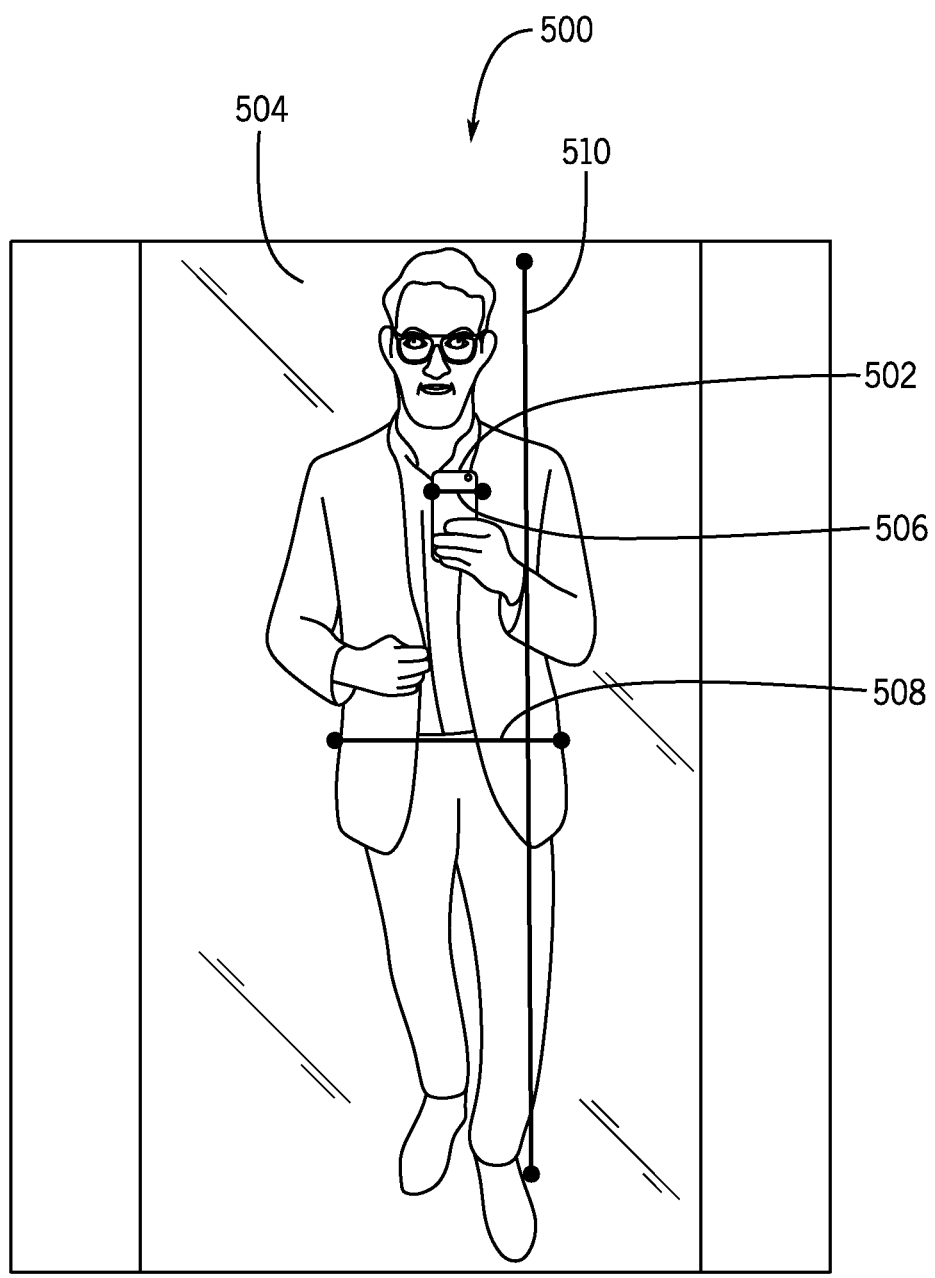
FIG. 5 illustrates an example approach that can be utilized in accordance with various embodiments.

FIG. 5 illustrates an example approach to determining a scaling factor and determining a size of an article of clothing based on the scaling factor. FIG. 5 represents an image 500 captured by a mobile device, with the representation of the mobile device 502 being present in the image 500. In the example of FIG. 5, a mirror 504 is used as the reflective surface, though as noted previously other reflective surfaces can be used as well. Dimension 506 represents the width of the representation of the mobile device 502 in the image. Thus, at least one representation dimension, the representation width 506, can be determined for the mobile device used to capture the image in the example of FIG. 5. Other representation dimensions can be determined as well.

According to various embodiments, dimensions of representations of other objects can be used to determine a scaling factor. For example, a first mobile device can be used to capture an image, but a second mobile device may be more clearly represented in the captured image than the first mobile device. Thus, representation dimensions of the second mobile device can be determined. In various embodiments, objects of known dimensions can be used to determine a scaling factor. For example, if a dollar bill is represented in the image, representation dimensions of the dollar bill can be compared to known dimensions of a dollar bill to determine a scaling factor.

As discussed above, one technique for determining a scaling factor includes the use of pixel measurement of representation dimensions of the representation of the mobile device, although additional measurement units are envisioned in various embodiments. For example, the number of pixels comprising the representation width 506 of the mobile device can be determined. The actual width of the mobile device can be determined or retrieved using the above-described techniques. A scaling factor can then be determined based on the proportionality between the representation width 506 and the actual width of the mobile device. In embodiments, determination of the scaling factor takes into account the depths and angles. For example, determination of the scaling factor can include determining the distance between the mobile device and the reflective image. In embodiments, the distance can be measured using a light source, such as a laser, on the mobile device. In embodiments, determining the scaling factor can also include determining one or more angles. For example, if the mobile device is held above a user's head, the angle formed between the mobile device, the reflective surface, and the user's shoes will be greater than the angle formed by these three objects when the mobile device is held at chest level. Thus, it may be the case that in the former instance the shoes appear further away in the captured image than in the latter instance. In embodiments, the plane in which the mobile device substantially lies may not be parallel to the plane in which the reflective surface substantially lies. For example, a user may hold a mobile device to her side and angle it toward the reflective surface. The angle of rotation can be taken into account to determine the scaling factor in embodiments.

Dimensions of the representation of the subject can be determined from the image. For example, the subject's height 510 in the image and the subject's width 508 at the waist can be determined. Measurements can be taken of, for example, the user's pants, shoes, jacket, or eyeglasses. Pixel measurements of the representations of these articles can be converted into actual measurements of these articles using the determined scaling factor.

In various embodiments, the scaling factor can be refined based on other dimensions of the representation of the mobile device. For instance, a second scaling factor can be determined based on a proportionality between the representation length and the actual length of the mobile device. In FIG. 5, for example, the entire length of the mobile device representation is not visible. In embodiments, a portion of the mobile device may be concealed in the captured image. A skin detection algorithm can be used to determine whether a user's hand is concealing a portion of the mobile device in the image. For example, it can be determined that in the vicinity of the flash, an object having the characteristics of a user's hand is obstructing a portion of the mobile device from view. Such an algorithm can take into account skin tone from other portions of the image. This algorithm can also take into account an expected shape and size of a hand as well as an expected obstruction pattern for a hand.

Thus, even when a user's skin is not visible—for example when the user is wearing a glove—it is possible to determine whether a portion of the mobile device has been concealed in the image. In embodiments, if it is determined that one or more portions of the mobile device have been concealed, the concealed portions can be estimated from the visible portions. For example, various techniques, such as those discussed in this disclosure, can be used to detect unconcealed edges of the mobile device. The unconcealed edges can be estimated, sometimes using known information about the mobile device, in order to build a model of the unconcealed mobile device. In FIG. 5, for example, although the entire length of the representation of the mobile device is not visible, lines corresponding to the vertically oriented edges of the representation of the mobile device can be drawn. Likewise, the bottom edge of the representation of the mobile device can be determined. From this information, a full model of the mobile device can be generated. This model can be generated as an overlay of the captured image, such that a visual indication of the generated model is provided. In embodiments, generating a model of the unconcealed mobile device refers to determining the dimensions of the concealed and unconcealed portions of the mobile device, even in the absence of any visual reconstruction of the concealed portions.

Figure 6C:
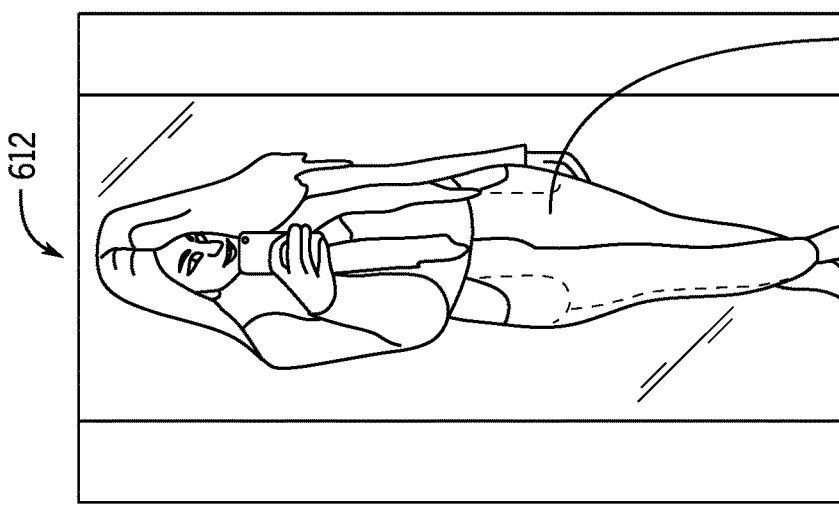
FIGS. 6A-6C illustrate an example approach that can be utilized in accordance with various embodiments.
Figure 6B:
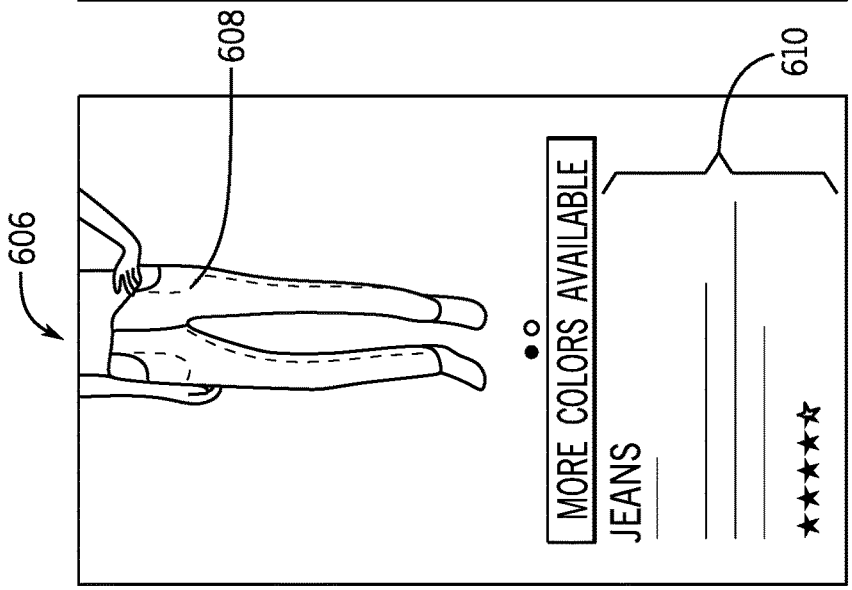
Figure 6A:
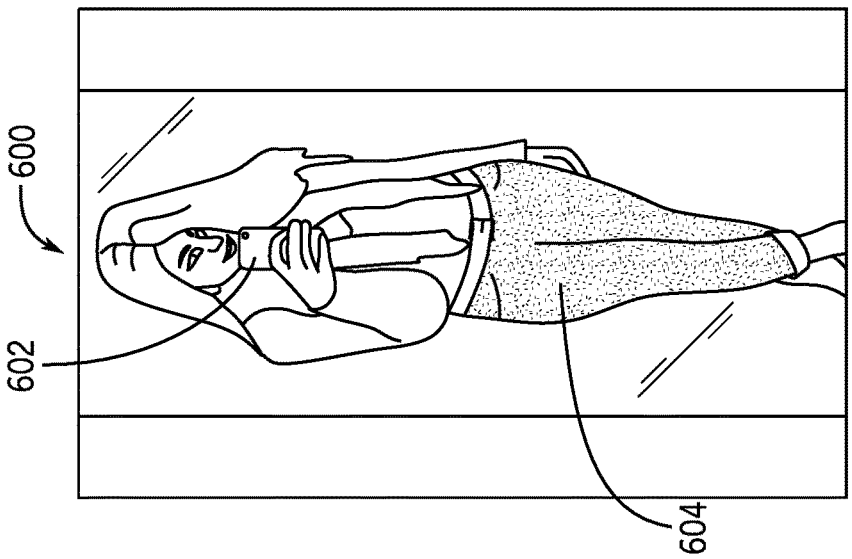

FIGS. 6A-C illustrate an example approach according to various embodiments. A user can capture an image 600 according to various embodiments disclosed herein. For example, the representation of the mobile device 602 captured in the image 600 can be used to determine the size of an article of clothing 604 worn by the subject. Information can then be generated about the first article of clothing, and this information can be provided at an interface of the mobile device. The content and availability of this information can depend on the context in which the image 600 is captured.

In embodiments, during capture of the image, GPS coordinates indicating a location of capture are recorded. GPS coordinates can be used to trigger various actions. For example, if it is determined that an image is self-captured and the mobile device indicates that the image was captured at a retail clothing store, the provided information can include variations, ratings, and pricing information from an online retailer, among other information. For example, the subject can be directed to an electronic retail environment (e.g., on the mobile device doing the capturing, at another computing device, etc.) based on the determination that the user self-captured an image in a physical retail environment.

In embodiments, information can be generated, regardless of the user's location, related to a second article of clothing. For example, a scaling factor can be used to determine the size of pants 604 in image 600. FIG. 6B depicts an image 606 of a second article of clothing 608 and associated information 610. The second article of clothing 608 can be determined to correspond in size to the size of the first article of clothing 604. The associated information 610 can include variations, ratings, and pricing information for the second article of clothing 608. Thus, in embodiments, a subject can self-capture an image while wearing his or her favorite jeans. Different jeans in the same size can then be recommended based at least in part upon the determination that the image 600 was self-captured.

In embodiments, the recommendation for the second article of clothing 608 can be determined in part by audio data associated with the image 600. For example, a subject can self-capture the image 600 on a mobile device. A user can then caption the image 600 with text or provide audio commentary. For instance, the subject can note with the audio data that she wants jeans that fit like the pants 604 she is wearing. Thus, an image 606 can be provided of jeans 608 meeting the subject's criteria.

In embodiments, an augmented reality overlay 614 can be generated of the second article of clothing 608. Thus, an image 612 can be generated in which the augmented reality overlay 614 of the second article of clothing is shown in place of the first article of clothing 604 in the first image 600. In other words, a subject who self-captures an image can "try on" articles of clothing using an augmented reality overlay.

Figures 7A, 7B:
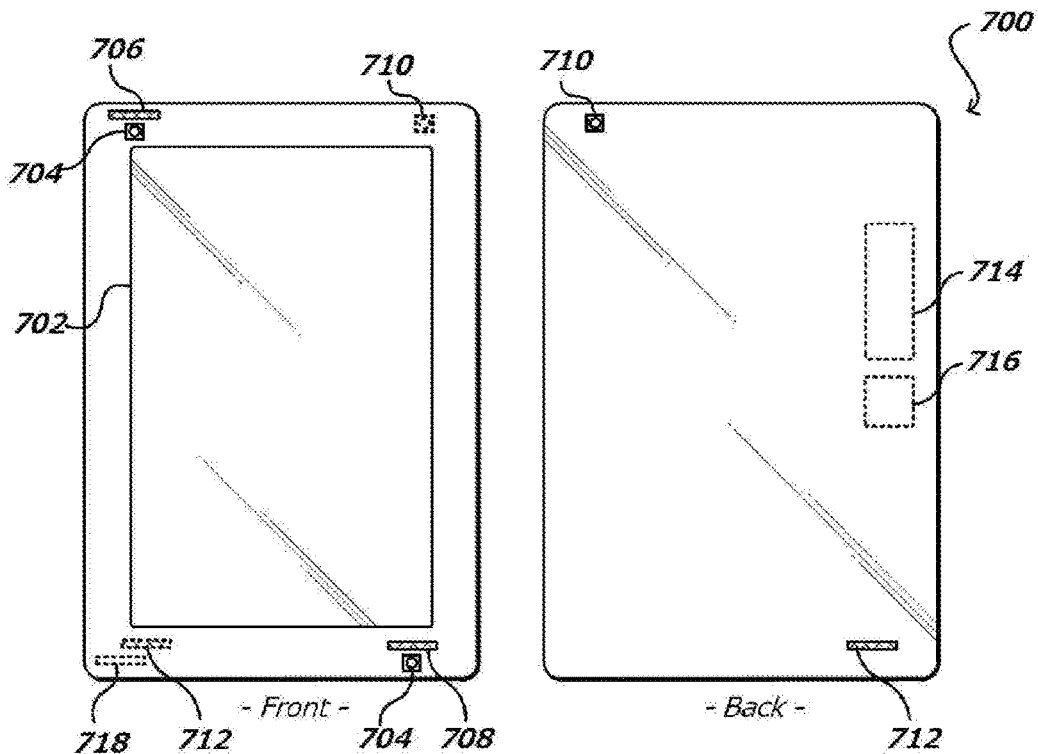
FIGS. 7A-7B illustrate an example mobile device that can be utilized in accordance with various embodiments.

FIGS. 7A-7B illustrate front and back views of an example mobile device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the mobile device 700 has a display screen 702 (e.g., an LCD element) operable to display information or image content to one or more users or viewers of the device. The display screen of some embodiments displays information to the viewers facing the display screen (e.g., on the same side of the computing device as the display screen). The mobile device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the mobile device can use the images (e.g., still(s) or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The mobile device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
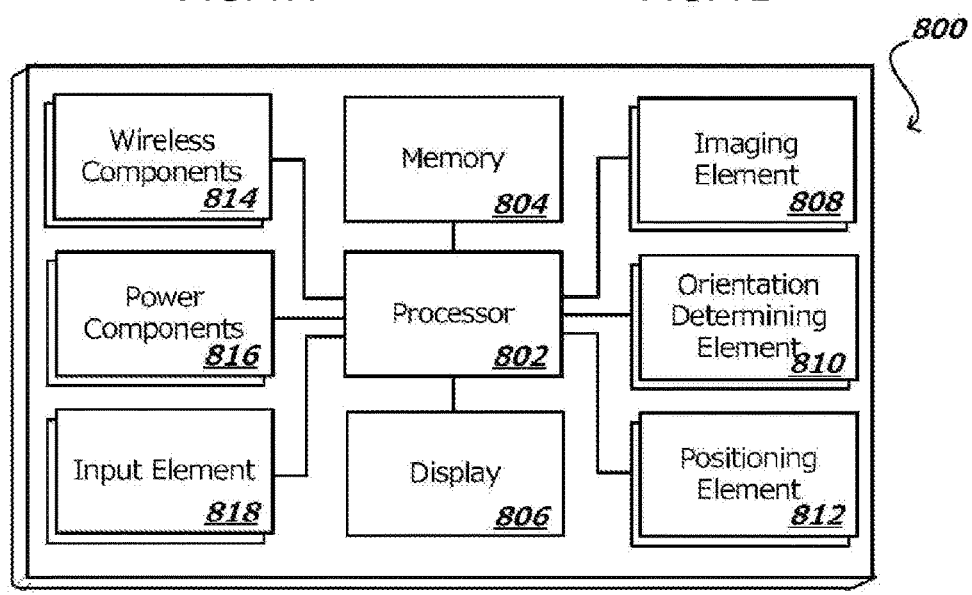
FIG. 8 illustrates an example environment that can be utilized in accordance with various embodiments.

FIG. 8 illustrates a set of basic components of an electronic computing device 800 such as the device 700 described with respect to FIGS. 7A-7B. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example mobile device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments may include at least a positioning element 812 for determining a location of the device (or the user of the device). Thus, in embodiments, it may be determined that the user of the device is in a cold climate, and search results may take this into account by ranking, for example, snow boots over rain boots, or otherwise factoring in the user's location. A positioning element can include or comprise a GPS or similar location-determining elements operable to determine relative coordinates for a position of the device. Positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a mobile device (e.g., using GPS), the mobile device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the mobile device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
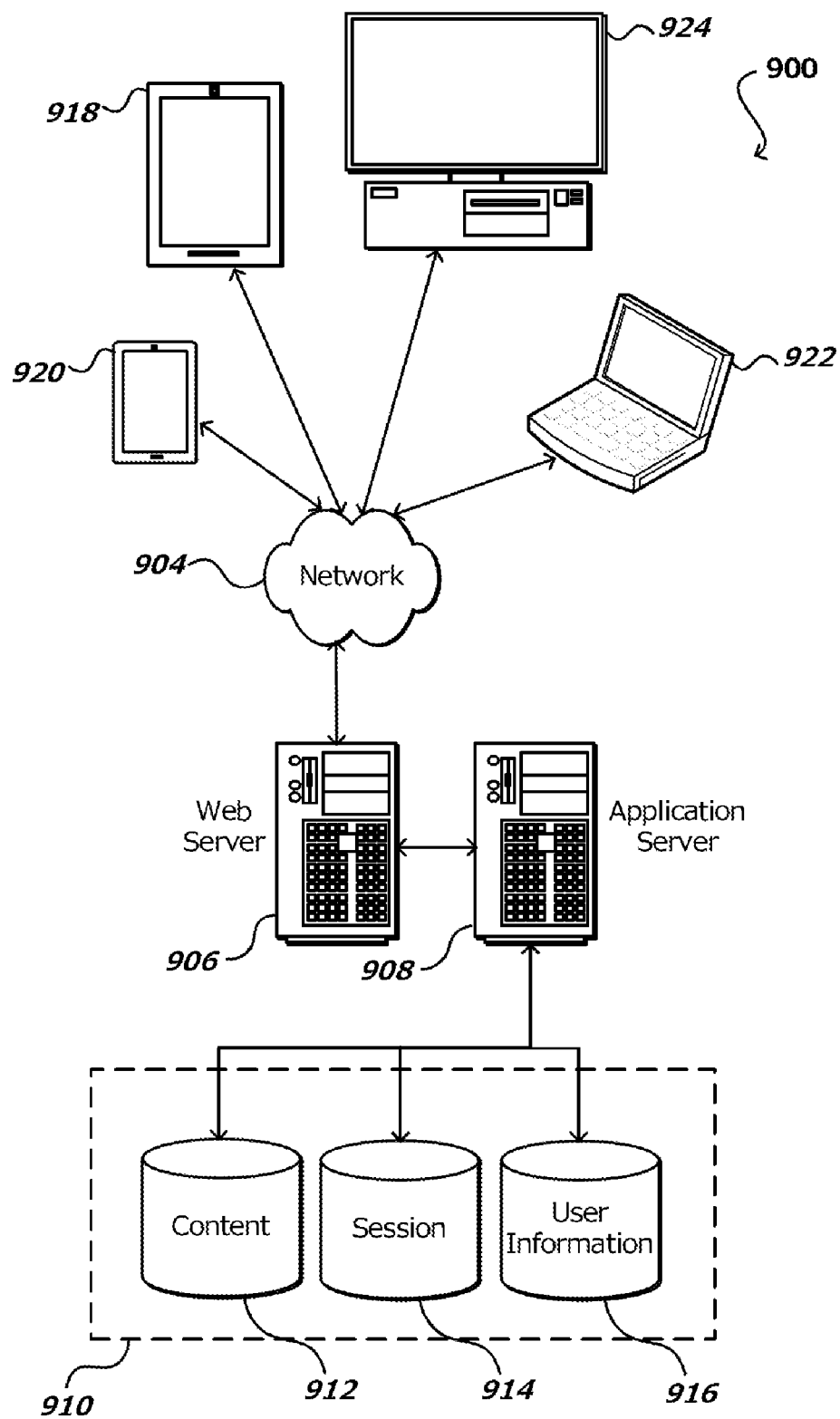
FIG. 9 illustrates an example environment that can be utilized in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. In some examples, multiple devices may be used in conjunction with one another.

The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. For example, a data store as described can include a database to search for identified reference items according to various embodiments. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present techniques, such as those set forth in the claims.

What is claimed is:

1. A computer-implemented method for processing images, comprising:
   under the control of one or more computer systems configured with executable instructions,
   activating a flash element of a mobile device;
   capturing, during activation of the flash element, an image with the mobile device, the image including a representation of the mobile device reflected in a mirror;
   locating, in the image, a reflection in the mirror of a flash produced by the activation of the flash element;
   identifying, using an edge detection algorithm, candidate edges of one or more objects captured in the image;
   identifying, among the candidate edges, mobile device edges corresponding to edges of the representation of the mobile device captured in the image, based at least in part upon a proximity of one or more candidate edges to a location of the reflection of the flash in the image;
   determining one or more representation dimensions of the mobile device based at least in part upon a measurement in pixels of the mobile device edges in the representation of the mobile device in the image, the representation dimensions of the mobile device including at least a mobile device representation length and a mobile device representation width;
   retrieving, from a database including mobile device specification information, one or more actual dimensions of the mobile device, the actual dimensions of the mobile device including a mobile device actual length and a mobile device actual width;
   determining a scaling factor for the image, the scaling factor corresponding to a proportionality between one or more representation dimensions of the mobile device and one or more actual dimensions of the mobile device;
   determining that a first article of clothing is present in the image; and
   determining a size of the first article of clothing based at least in part upon the scaling factor determined for the image.

2. The computer-implemented method of claim 1, further comprising:
   generating description data during capture of the image, the description data including information capable of identifying the mobile device; and
   retrieving, from the database including mobile device specification information, the one or more actual dimensions of the mobile device based on the description data.

3. The computer-implemented method of claim 1, wherein activating the flash element of the mobile device is performed a plurality of times to produce a particular flash pattern, and further comprising:
   locating, in the image, a reflection of the particular flash pattern.

4. The computer-implemented method of claim 1, further comprising:
   determining that a size of a second article of clothing corresponds to the size of the first article of clothing; and
   generating an augmented reality overlay on the image, the augmented reality overlay depicting the second article of clothing in place of the first article of clothing in the image.

5. The computer-implemented method of claim 1, wherein detecting mobile device boundaries in the image further comprises:
   determining that one or more portions of the representation of the mobile device are concealed in the image; and
   determining an estimation of the one or more concealed portions of the representation of the mobile device based on one or more visible portions of the representation of the mobile device.

6. A computer-implemented method for image processing, comprising:
   under the control of one or more computer systems configured with executable instructions,
   activating an illumination element of a mobile device while a first image is being captured by the mobile device, the first image including a reflective surface;
   locating, in the first image, a reflection of an illumination produced by the activation of the illumination element;
   identifying, using an edge detection algorithm, candidate edges of objects captured in the first image;
   identifying, among the candidate edges, mobile device edges corresponding to edges of the representation of the mobile device captured in the first image based at least in part upon proximity of one or more of the candidate edges to a location of the reflection of the illumination in the first image; and
   determining that a representation of the mobile device is present in the first image based at least in part upon (i) locating the reflection of the illumination and (ii) identifying the mobile device edges.

7. The computer-implemented method of claim 6, wherein the illumination produced by the activation of the illuminating element comprises a flash, and wherein locating the reflection of the illumination produced by activation of the illumination element comprises locating a reflection of the flash in the reflective surface.

8. The computer-implemented method of claim 6, wherein activating the illumination element comprises activating the illumination element for a first time, and further comprising:
   determining in a first frame of image data that the representation of the mobile device is present at a first location in the image;
   determining in a second frame of image data that the representation of the mobile device cannot be located at the first location;
   causing, in response to determining in the second frame of image data that the representation of the mobile device cannot be located at the first location, the illumination element to activate for a second time;
   locating a second reflection of the illumination produced by the activation of the illumination element; and
   determining in a third frame of image data that the representation of the mobile device is present at a second location in the image based at least in part upon locating the second reflection of the illumination produced by the activation of the illumination element.

9. The computer-implemented method of claim 6, wherein the illumination produced by activation of the illumination element comprises a flash, and wherein locating the illumination produced by activation of the illumination element further comprises:
  generating a first binary mask based on the first image;
  capturing a second image without activation of the illumination element;
  generating a second binary mask based on the second image;
  generating a difference image by subtracting the second binary mask from the first binary mask; and
  identifying the illumination in the difference image.

10. The computer-implemented method of claim 6, wherein determining that the mobile device is present in the first image based at least in part upon location of the illumination further comprises:
  identifying a substantially rectangular shape in the first image within a threshold distance of the located reflection of the illumination;
  determining an aspect ratio corresponding to the identified substantially rectangular shape in the first image;
  determining, based on a random sample consensus, a correlation between the determined aspect ratio and a known aspect ratio, the known aspect ratio corresponding to an aspect ratio of a known mobile device; and
  determining that the representation of the mobile device is present in the first image based at least in part upon the correlation between the determined aspect ratio of the identified substantially rectangular shape in the first image and the known aspect ratio corresponding to the known mobile device.

11. A system for image processing, comprising:
  at least one processor;
  memory including instructions that, when executed by the at least one processor, cause the system to:
    locate, in an image, a reflection of a flash produced by a mobile device;
    identify a substantially rectangular shape in the image within a threshold distance of the located reflection of the flash;
    determine an aspect ratio corresponding to the identified substantially rectangular shape in the image;
    determine, based on a random sample consensus, a correlation between the determined aspect ratio and a known aspect ratio, the known aspect ratio corresponding to an aspect ratio of a known mobile device; and
    determine that a representation of the mobile device is present in the image based at least in part upon (i) locating the reflection of the flash in the image and (ii) determining the correlation between the determined aspect ratio of the identified substantially rectangular shape in the image and the known aspect ratio corresponding to the known mobile device.

12. The system of claim 11, wherein the image is one of a plurality of images stored in a database, and wherein the memory further includes instructions that, when executed by the at least one processor, further cause the system to:
  categorize, within the database, the image as a self-captured image based at least in part upon the determination that the representation of the mobile device is present in the image.

13. The system of claim 11, wherein the memory further includes instructions that, when executed by the at least one processor, further cause the system to:
  retrieve description data generated during capture of the image, the description data including information capable of identifying the mobile device; and
  retrieve, using the description data, from a database including mobile device specification information, one or more actual dimensions of the mobile device.

14. The system of claim 11, wherein the memory further includes instructions that, when executed by the at least one processor, further cause the system to:
  identify, using an edge detection algorithm, candidate edges of objects captured in the image;
  identify, among the candidate edges, mobile device edges corresponding to edges of the representation of the mobile device captured in the image based at least in part upon proximity of one or more candidate edges to a location of the reflection of the flash located in the image;
  determine one or more representation dimensions of the mobile device based at least in part upon a measurement in pixels of the mobile device edges in the representation of the mobile device in the image, the representation dimensions of the mobile device including at least a mobile device representation length and a mobile device representation width;
  retrieve, from a database including mobile device specification information, one or more actual dimensions of the mobile device, the actual dimensions of the mobile device including a mobile device actual length and a mobile device actual width; and
  determine a scaling factor for the image, the scaling factor corresponding to a proportionality between one or more representation dimensions of the mobile device and one or more actual dimensions of the mobile device.

15. The system of claim 14, wherein the memory further includes instructions that, when executed by the at least one processor, further cause the system to:
  determine that an article of clothing is present in the image; and
  determine a size of the article of clothing based at least in part upon the scaling factor determined for the image.

16. The system of claim 15, wherein the article of clothing comprises a first article of clothing, and wherein the memory further includes instructions that, when executed by the at least one processor, further cause the system to:
  determine that a size of a second article of clothing corresponds to the size of the first article of clothing; and
  generate an augmented reality overlay on the image, the augmented reality overlay depicting the second article of clothing in place of the first article of clothing in the image.

17. The system of claim 11, wherein the image comprises a first image, and wherein locating, in the image, the reflection of the flash produced by the mobile device further comprises:
  capturing the first image concurrently with activation of a flash element;
  generating a first binary mask based on the first image;
  capturing a second image without activation of the flash element;
  generating a second binary mask based on the second image;
  generating a difference image by subtracting the second binary mask from the first binary mask; and
  identifying the flash in the difference image.

18. The system of claim 11, wherein the mobile device includes a global positioning system (GPS) receiver, and wherein the memory further includes instructions that, when executed by the at least one processor, further cause the system to:

capture the image;
record, during capture of the image, GPS coordinates indicating a location of capture;
if the location of capture corresponds to a location of a retail clothing store, identify an article of clothing in the image;
search a clothing database for the article of clothing; and
provide, at an interface of the mobile device, information related to the article of clothing.

* * * * *